(12) United States Patent
Latour et al.

(10) Patent No.: US 11,350,276 B2
(45) Date of Patent: May 31, 2022

(54) SECURE MOBILE INTERNET-OF-THINGS (IOT) DEVICE REGISTRY MANAGEMENT

(71) Applicant: Canadian Internet Registration Authority, Ottawa (CA)

(72) Inventors: Jacques Latour, Ottawa (CA); Dave Chiswell, Ottawa (CA)

(73) Assignee: Canadian Internet Registration Authority, Ottawa (CA)

( * ) Notice: Subject to any disclaimer, the term of this patent is extended or adjusted under 35 U.S.C. 154(b) by 199 days.

(21) Appl. No.: 16/890,670

(22) Filed: Jun. 2, 2020

(65) Prior Publication Data

US 2021/0377735 A1 Dec. 2, 2021

(51) Int. Cl.
| | | |
|---|---|---|
| H04L 29/06 | (2006.01) | |
| H04W 12/069 | (2021.01) | |
| H04L 9/32 | (2006.01) | |
| H04L 9/40 | (2022.01) | |
| H04L 9/08 | (2006.01) | |
| H04W 12/04 | (2021.01) | |
| H04L 9/30 | (2006.01) | |
| H04W 12/03 | (2021.01) | |
| G16Y 30/10 | (2020.01) | |

(52) U.S. Cl.
CPC ......... *H04W 12/069* (2021.01); *H04L 9/0891* (2013.01); *H04L 9/30* (2013.01); *H04L 9/3268* (2013.01); *H04L 63/166* (2013.01); *H04W 12/03* (2021.01); *H04W 12/04* (2013.01); *G16Y 30/10* (2020.01); *H04L 2209/80* (2013.01)

(58) Field of Classification Search
USPC ........................................................ 713/153
See application file for complete search history.

(56) References Cited

U.S. PATENT DOCUMENTS

| 10,951,431 B1* | 3/2021 | Raman ................ H04L 41/0846 |
| 2019/0158594 A1* | 5/2019 | Shadmon ............ G06F 16/2471 |
| 2019/0281421 A1* | 9/2019 | Choi ....................... H04L 67/16 |
| 2019/0334869 A1* | 10/2019 | Grant .................... H04L 61/305 |

* cited by examiner

*Primary Examiner* — Jeffrey C Pwu
*Assistant Examiner* — Samuel Ambaye
(74) *Attorney, Agent, or Firm* — Oblon, McClelland, Maier & Neustadt, L.L.P.

(57) ABSTRACT

The secure IoT registry and associated provisioning method simplifies the IoT cloud provider operations with respect to managing mobile IoT eSIM credential provisioning/certificate key management. The secure IoT Registry enables network operators such as a Mobile Network Operator (MNO) to understand and map the IoT device ownership in relationship to cloud providers to facilitate business functions like charge back mechanisms. The secure IoT registry integrates a next generation registry based Certificate Authority (CA) system enabling trusted and simpler mechanisms to validate certificates and their state.

18 Claims, 6 Drawing Sheets

SECURE MOBILE INTERNET-OF-THINGS (IOT) DEVICE REGISTRY MANAGEMENT

TECHNICAL FIELD

The present disclosure relates to networked IoT devices and in particular to secure mobile Internet-of-things (IoT) device registry management.

BACKGROUND

The 'Internet-of-Things' (IoT) has been defined as a system of interrelated IoT devices, mechanical and digital machines, objects, sensors or devices that are provided with unique identifiers and the ability to transfer data over a network without requiring human-to-human or human-to-computer interaction. The prevalence of IoT devices has rapidly expanded with network enabled IoT devices and advanced wireless networks. These devices can leverage cloud computing to provide communication between devices, service providers and owners and the collection and processing of data. However, typical IoT devices are hard-coded to connect to a specific cloud (or application) service provider presenting new management challenges for these devices. For example, if a city is deploying IoT enabled devices, such as parking meters, the deployment would require each device to be configured to operate with a selected mobile network operator (MNO) and an cloud service providers. If the city changes the cloud service provider for the smart parking meter they have to touch every smart parking unit, or any IoT devices, to report back to a new cloud service provider (CSP), or more drastically, change all the smart parking meters to those of the new CSP, however, owners of large IoT device deployments are locked in with a specific vendor due to the complexity and high cost of change.

The deployment of new pervasive wireless technologies such as 5G wireless technology for digital cellular networks will increase the deployment of IoT devices and sensors throughout public networks and increase the possible cyber-security attack surface. As IoT devices can be directly accessible via the mobile network or public Internet making them vulnerable to attack. Existing technologies attempt to secure organizations that deploy IoT devices that were themselves built without adequate security, however new approaches to provide management flexibility while secure the IoT devices are also required.

Accordingly, systems and methods that enable flexible and secure networked IoT device management remains highly desirable.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-6.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of a networked Internet-of-Things (IoT) device management at a registry server. The method also includes receiving through a mobile network a device identifier (ID) and a public encryption certificate (CERT) associated for a networked IoT device from a cloud service provider (CSP); generating an encrypted applet using the public encryption cert associated with the networked IoT device, the encrypted applet containing public and private encryption cert for the networked IoT device, a registry public cert and CSP network connection information for association with an eSim of the networked IoT device; sending the encrypted applet to a mobile network operator (MNO) of the mobile network; receiving a request from the networked IoT device via the mobile network to provide a registry cert; sending the registry cert to the networked IoT device; receiving a request from the networked IoT device to provide an associated record for the networked IoT device; sending the networked IoT device CERT to the networked IoT device; receiving a request from the CSP to provide the associated record for the networked IoT device; and sending networked IOT device CERT to the CSP. Other embodiments of this aspect include corresponding computer systems, apparatus, and computer programs recorded on one or more computer storage devices, each configured to perform the actions of the methods.

One general aspect includes a non-transitory computer readable memory containing instructions which when executed by a processor perform the method of: The non-transitory computer readable memory also includes receiving through a mobile network a device identifier (ID) and a public encryption certificate (CERT) associated for a networked IoT device from a cloud service provider (CSP); generating an encrypted applet using the public encryption cert associated with the networked IoT device, the encrypted applet containing public and private encryption cert for the networked IoT device, a registry public cert the CSP network connection information; sending the encrypted applet to a mobile network operator (MNO) of the mobile network; receiving a request from the networked IoT device via the mobile network to provide a registry certificate; sending the associated registry cert to the networked IoT device; receiving a request from the networked IoT device to provide an associated record for the networked IoT device; sending the associated networked IoT device CERT to the networked IoT device; receiving a request from the CSP to provide the associated record for the networked IoT device; and sending a CERT for networked IoT device to the CSP. Other embodiments of this aspect include corresponding computer systems, apparatus, and computer programs recorded on one or more computer storage devices, each configured to perform the actions of the methods.

One general aspect includes a method of managing a networked IoT device. The method also includes receiving a security applet from a registry system coupled to a computer network for associating the networked IoT device with an application service provide (CSP) associated with an owner of the networked IoT device; decrypting security applet containing public and private encryption keys associated with the networked IoT device, and CSP connection information for association with an eSim of the networked IoT device; sending a first query for a first certificate associated with the registry; verifying the first certificate received from the registry; installing cloud service provider profile on an eSim of IoT device when the first certificate is verified; sending a second query for a second certificate associated with the networked IoT device; and verifying the second certificate received from the registry. Other embodiments of this aspect include corresponding computer systems, apparatus, and computer programs recorded on one or more computer storage devices, each configured to perform the actions of the methods.

The disclosed system and method enables generic IoT devices manufacturer and vendors independent IoT cloud service providers to interoperate and enable any IoT device to connect work between cloud service providers. By utilizing a secure registry man-in-the-middle attacks can be mitigated by securely enabling the transmission of encrypted cloud application credentials (certificate/keys) from the IoT Registry to IoT devices, with 'proof' of destruction of private keys. The registry system provides a new root of trust, simplify the validation of cloud service providers certificates and individual IoT device keys by using the cryptographically enabled public domain name system (DNS) infrastructure. The system and method leverage the Domain Name System Security Extensions (DNSSEC) feature and extend the functionality to networked IoT devices. DNSSEC is a suite of Internet Engineering Task Force (IETF) specifications for securing certain kinds of information provided by the Domain Name System (DNS) as used on Internet Protocol (IP) networks.

There is also provided a system and method for providing a networked Internet-of-Things (IoT) device management utilizing a registry server. The registry server associates a device identifier (ID) and a public encryption certificate (CERT) associated for a networked IoT device from a cloud service provider (CSP) to generate an applet for configuring the network IoT device. An encrypted applet is sent to the network IoT device via the network operator. The applet is generated using the public encryption CERT associated with the networked IoT device, the encrypted applet containing public and private encryption CERT for the networked IoT device, a registry public CERT and CSP network connection information for association with an eSIM of the networked IoT device. Confirmation queries are received from the networked IoT device to confirm identify of the registry and verify the IoT device CERT is consistent. The CSP can also request confirmation of the networked IoT device from the registry. The queries from the networked IoT device and the CSP are generated using Domain Name System Security Extensions (DNSSEC) for authentication and data integrity utilizing Domain Name System (DNS) public infrastructure.

The secure IoT registry and associated provisioning method simplifies the IoT cloud provider operations with respect to managing mobile IoT eSIM credential provisioning/certificate key management. The IoT cloud provider simply does not have to worry about that aspect. The secure IoT Registry enables the Mobile Network Operator (MNO) to understand and map the IoT device ownership in relationship to cloud providers to facilitate business functions like charge back mechanisms. The secure IoT registry integrates a next generation DNSSEC based Certificate Authority (CA) system enabling trusted and simpler mechanisms to validate certificates and their state.

Figure 1:
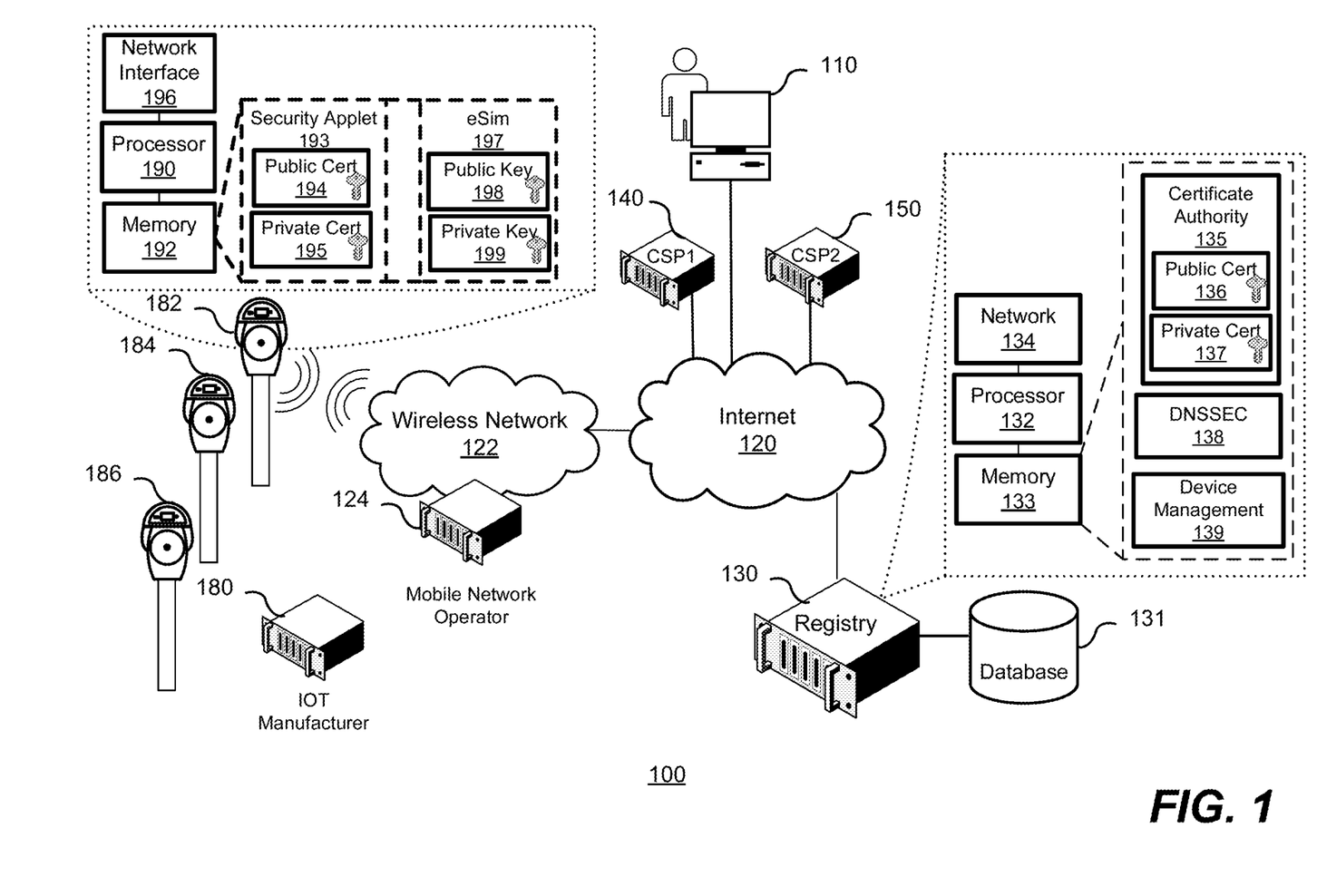
FIG. 1 shows a system for secure mobile internet-of-things (IoT) device management.

FIG. 1 shows a system for mobile/networked Internet-of-Things (IoT) device management. The described system provides a secure IoT registry framework that bridges the gap between the MNO 124, the Cloud Service Providers (CSP) 140/150, the IoT device manufacturers 180 and the mobile IoT devices 182/184/186 and device owner 110. The core feature of the IoT registry 130 is the enablement of connectivity for generic IoT devices 182/184/196 to connect to any CSP 140/150 from any MNO 124 securely. The secure IoT registry 130 provides a vendor agnostic system that can scale to include all types of IoT devices (e.g. sensors, smart city, critical infrastructure, home security, industrial devices, medical devices, etc.). The described system enables the zero touch provisioning of thousands of (one) embedded subscriber identify module (eSIM) enabled generic smart devices 182/184/186 for a device owner. The MNO 124 has commercial relationship with the registry operator 130 as a certified MNO 124. The owner 110, owns and operate a smart devices 182/184/186, such as for example parking meters, however any network capable smart device can utilize the secure IoT registry 130. The IoT device manufacturer 180, for example mobile IoT smart parking meter manufacturer, has commercial relationship with the owner 110, such as a municipality. On acquisition the IoT device manufacturer 180 provides the owner 110 the list of device identifiers such as Universal Integrated Circuit Card Identifiers (UICCIDs) and associated public keys. The IoT device manufacturer 180 has commercial relationship with MNO 124. Cloud service provider 1 (CSP1 140), an IoT ASP1 140 specializing in parking management in smart city context. CSP1 140 has an active commercial relationship with the owner 110 and is the current provider of service for the IoT device manufacturer 180 and a commercial relationship with the Secure IoT registry 130 as a certified cloud service provider. CSP1 140 provides the service connection information requirements (domain name, port number, protocol). Although the term mobile network operator is utilized in the accompanying description, the IoT devices may also be alternatively associated with a wired network operator or infrastructure.

The owner 110 can establish a new commercial relationship requiring all IoT devices 182/184/186 to connect to CSP2 150 at a given date and time. In traditional configuration each IoT device 182/184/186 would have to be manually reconfigured to be operable with CSP2 150. However, the use of the registry 130 enables the IoT devices 182/184/186 to be securely transferred between CSP's, for example from CSP1 140 to CSP2 150, without requiring the time consuming manual reconfiguration processes.

The registry 130 provides device management services to enable authorization and authentication of cloud service providers and devices. The registry 130 comprises a processor 132 coupled to a memory 133 providing a certificate authority 135. The certificate authority 135 provides encryption/decryption keys via a public certificate keys 136 and a private certificate keys 137 in a CSP CA certificate. The registry 130 also provides DNSSEC 138 functionality and device management 139. The network 134 interface couples the registry 130 to the Internet 120 or one or more intermediary networks. A database 131 contains IoT device 182/ 184/186 identifiers such as eUICCID/eID, public keys, ownership information, certificates, encryption keys, and cloud service provider association in addition to authorization codes to facilitate ownership transfer. The database can also provide an authoritative DNS for storing and providing DNSSEC signed CERT records for respective IoT devices 182/184/186.

Each of the IoT devices 182/184/186 has a processor 190 coupled to a memory 192. The memory stores the Security Applet 193, and an associated public certificate keys 194 and private certificate keys 195. In addition the memory provides eSim 197 functionality associated with eUICCID/eID. A public certificate key 198 and private certificate key 199 are each associated with the eSim 197 for network authentication and access. The network interface 196 provides a wireless networking transceiver to provide wireless network access 122. The wireless network 122 can provide wireless personal area network (PAN), wireless local area network (LAN), wireless metropolitan area network (MAN), cellular, or satellite based networks. The cellular network may provide access based upon cellular standards such as 3GPP wireless standards such as GSM, UMTS, LTE, 5G NR, and 5G.

Figure 2:
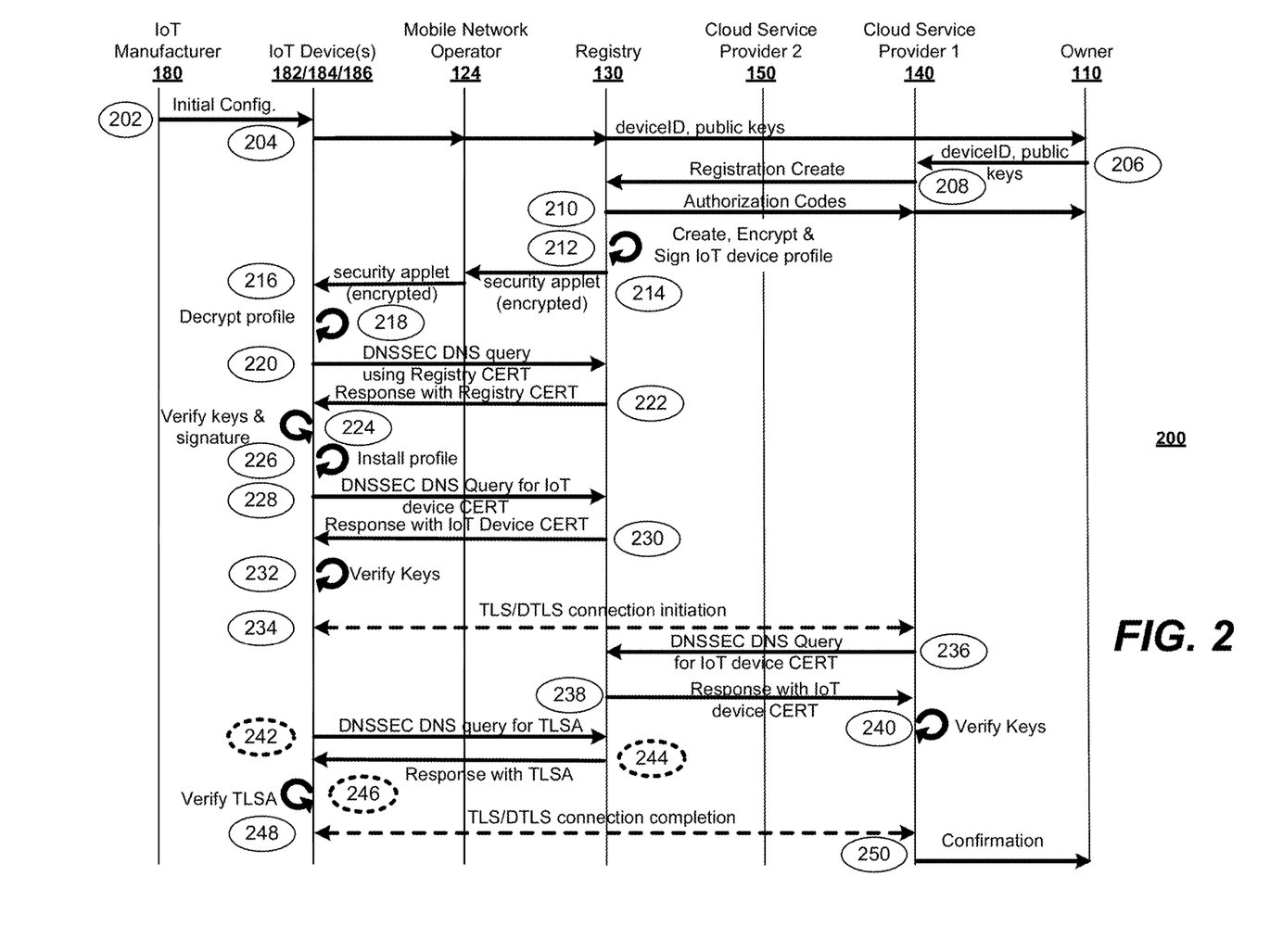
FIG. 2 shows a message flow for networked IoT device registration with a first cloud service provider.

FIG. 2 shows a message flow for mobile IoT device registration with a first cloud service provider (CSP1). The secure IoT registry 130 is utilized to secure the connectivity between mobile IoT devices 182/184/186 and their respective cloud service providers, CSP1 140 and CSP2 150 by securely sending the encrypted application credential (cert/ keys) on the IoT device eSIM profile via the mobile network operator. The cert/keys and their status can be validated over the network via simple DNS/DNSSEC queries for individual IoT devices and their CSP. The registry 130 enables an owner of the devices to securely register and migrate devices between CSPs without requiring physical reconfiguration of the devices 182/184/186.

In the process of deploying devices 182/184/186, an IoT device manufacturer 180 installs an initial configuration on each of the IoT devices 182/184/186 (202) which is associated with the owner 110. Each device has a unique device identifier (deviceID) and an associated public encryption key, the public keys can be generated by the manufacturing and installed on the device 182/184/186 before delivery. The owner 110 installs the IoT devices 182/184/186 and powers them on, activating the network connection to the wireless network 122 which are registered with the MNO 124. The MNO 124 registers the device identifiers as active with the secure IoT registry 130, and the device ID and public keys are provided or confirmed with the owner 110 (204). The owner 110 can then activates the devices 182/184/186 with the desired cloud service provider (CSP) which will provide the back-end services for the owner 110, such as CSP1 140, by providing device IDs and public keys (206). CSP1 140 then registers the devices 182/184/186 with the registry 130 (208). The registry 130 associates the deviceID with an identifier associated with the CSP.

The secure IoT registry 130 generates unique authorization codes (authcodes) for each IoT device which are utilized as a unique identifier of ownership to enable registry management for controlling CSP association (210) and safeguard against unauthorized transfers of the device between ASPs. The authcodes can be a randomly generated complex code by the registry 130 which may contain numbers, letters and special characters. Once the deviceIDs 182/184/186 are active with both the MNO 124 and the CSP1 140, the secure IoT registry 130 creates unique credential (public, private key pair) for each of the IoT devices and encrypts the credentials and signs the CSP connection information with the initial IoT device 'manufacturing' public key 198 (212). This information constitutes the content of the IoT security applet containing keys and CSP1 140 connection information such as IP Address, URL, port number and the CSP CA Certificate (CERT) to validate the CSP certificate if not using TLSA. It's important to note that the private keys are destroyed immediately after being encrypted in a non-accessible container within the registry 130. The registry 130 will then send the MNO 124 the encrypted applet for each IoT device 182/184/186 (214). The MNO in turn sends the encrypted applet information to the appropriate IoT device 182/184/186 (216).

Upon receiving the applet, the device 182/184/186 decrypts the received profile and may reboot if required. The devices 182/184/186 need to ensure its configuration information has not been tampered, for example it would check to see if it's public key is authentic and matches the information in the registry (218). The IoT device 182/184/ 186 performs a DNSSEC enabled DNS query to ensure the public key registered for the IoT device deviceID (such as UCCID) match using a CERT DNS query as for example defined in rfc4398 [https://tools.ietf.org/html/rfc4398] (220) The registry 130 returns the registry CERT record for the identified registry (222). The device 182/184/186 can then verify the certificate to confirm the registry identity and also verify the signature of the received profile (224) based upon the registry 130 public key. If the keys don't match then the device could be compromised. Confident with the identification of the registry 130, the device 182/184/186 reads the encrypted content of the IoT security applet and sends it to the eSIM to be decrypted with the corresponding unique private key and network configuration to be installed (226). Once the profile is installed, the device 182/184/188 then performs a DNSSEC enabled DNS query for the associated device CERT record to ensure that the credential certificate public keys are genuine and not tampered with (228). The registry 130 provides a response with the IoT device CERT record (230). The device 182/184/186 can then perform a hash of the credential certificate public keys for the IoT device 182/184/186 to determine if the public keys match (232). If the key hashes do not match then the device could be compromised.

Confident the credentials and connection information are authentic, the device 182/184/186 then needs to establish a transport layer security or datagram transport layer security (TLS/DTLS) connection to CSP1 140 (234). CSP1 140 verifies the authenticity of the IoT device 182/184/186 certificate by requesting IoT device CERT record from the registry 130 by a DNSSEC DNS query (236). The registry 130 provide the IoT device CERT record (238) which the CSP1 140 can then verify the certificate contained therein (240). If the certificate don't match then the device could be compromised. The IoT device 182/184/186 can then optionally perform a DNSSEC query for the Transport Layer Security (TLSA) protocol record [http://tools.ietf.org/html/ rfc6698] record for _443._TCP.ASP 1.XXX matches the key presented by CSP 1's IoT service endpoint (242). The registry 130 provides the TLSA (244) which can then be confirmed by the device 182/184/186 (246) The TLS/DTLS connection is then completed (248) and a confirmation can be provided to the owner 110 from CSP1 140 (250).

Figure 3:
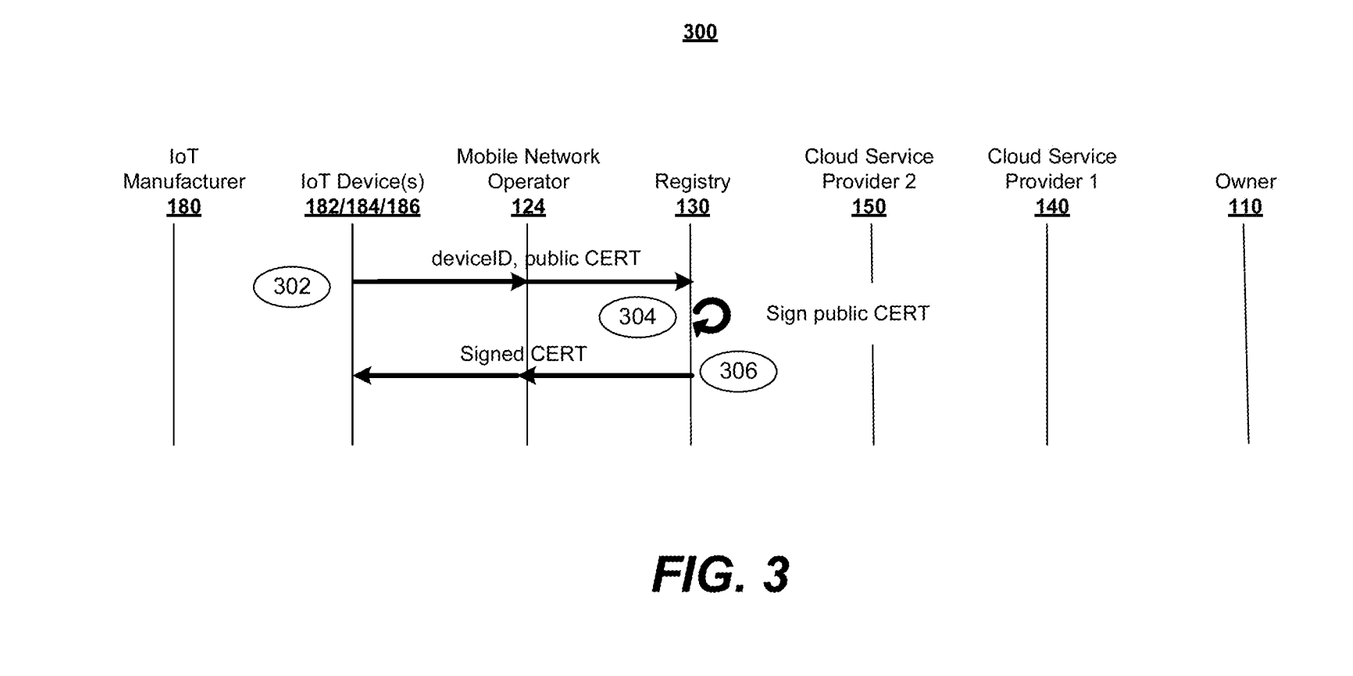
FIG. 3 shows a message flow for securing networked IoT device public certificate.

FIG. 3 shows a message flow for securing networked IoT device public certificate. The public CERT 194 is generated by the IoT device 182/184/186 and sent to the registry 130 (302) via MNO 124 or Internet 120. The registry 130 can then sign (304) the public CERT 194 and return the signed public CERT 194 to the IoT device (182/184/186) via MNO (124) or Internet 120.

Figure 4:
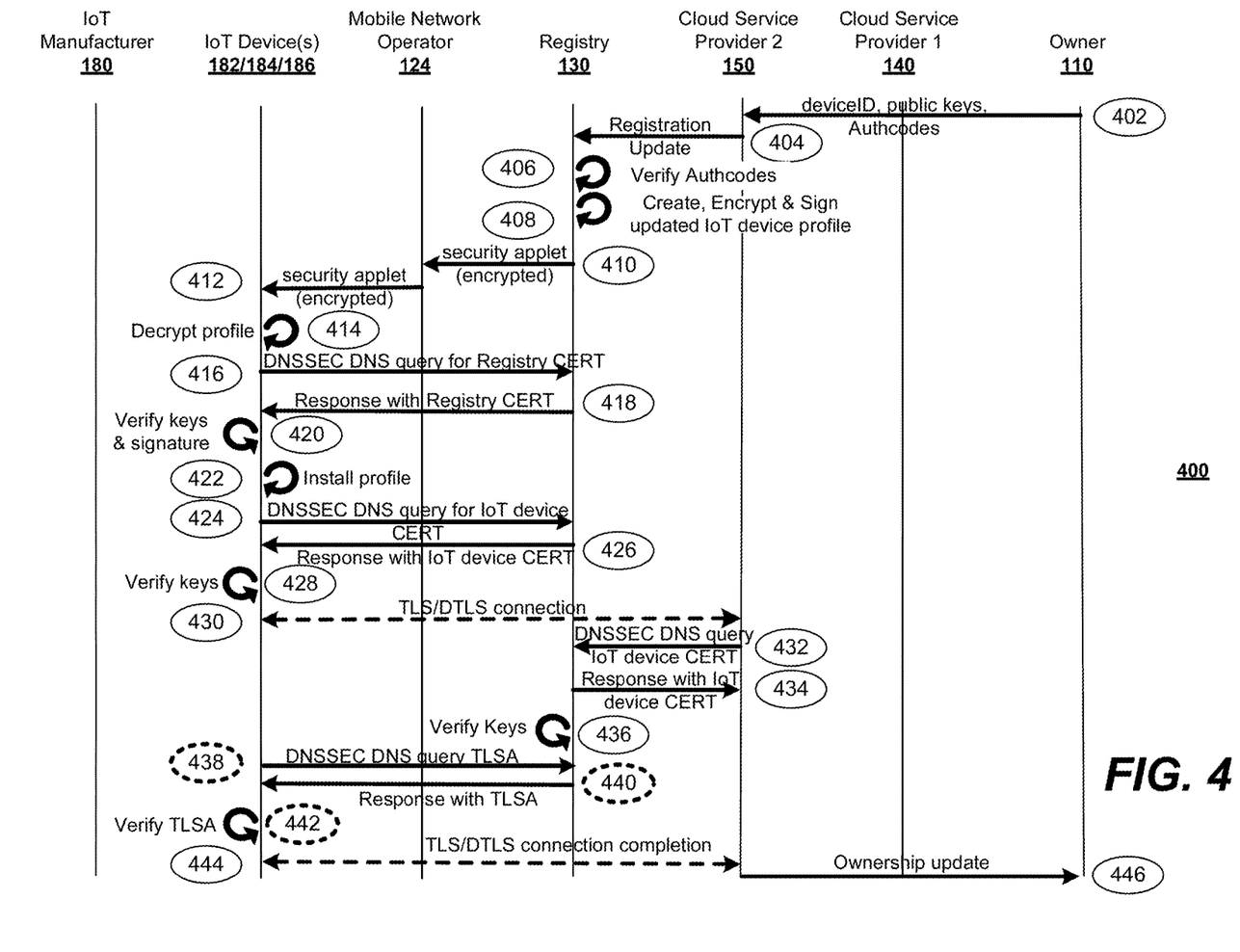
FIG. 4 shows a message flow for networked IoT device registration transfer to a second cloud service provider.

FIG. 4 shows a message flow for networked computing IoT device registration transfer to a second cloud service provider (CSP2) after initial registration of the IoT device 182/184/186. A transfer between ASPs, ASP1 140 to ASP2 150, can occur for example when a service contract for ASP1 140 has expired and the owner selected ASP2 150 as the new smart city parking meter cloud solution provider. Since the IoT device devices 182/184/186 are already registered and in use, the owner 110 has to prove ownership of the IoT devices 182/184/186 to initiate the transfer by providing the authcodes (authorization codes) that were previously generated. The owner 110 sets up the cloud services with the ASP2 150 and creates an account and import the IoT device(s) 182/184/186 and provides the eUICCID/eID, public keys and authcodes from the IoT device 192/184/186 (402). CSP2 150 sends a registration update request (404) to the registry 130. The provided authcodes are verified (406) against expected codes. If the codes match an updated IoT device profile is generated by the Secure IoT registry 130 by creating unique credential (public, private key pair and cert) for each of the IoT device, and encrypts the credentials and sign the CSP connection information, for CSP2 150, with the IoT device public key (408). The registry associates the deviceID with a CSP identifier. This information constitutes the content of the IoT security applet containing keys and ASP2 150 connection information. In addition the Registry 130 regenerates the authcode for the IoT device 182/184/186 so the old authcode is no longer valid. The IoT Registry 130 also publishes in its authoritative DNS a DNSSEC signed CERT record for that IoT device. It is important to note that the private keys associated with the devices are destroyed immediately after being encrypted in a non-accessible container within the registry 130. The registry 130 will then send the MNO 124 the encrypted applet for each IoT device 182/184/186 (410). The MNO then sends the encrypted applet information to the appropriate IoT device (412).

Upon receiving the applet, the device 182/184/186 decrypts the received profile and reboots. The devices 182/184/186 needs to ensure its configuration information has not been tampered with, for example it would check to see if it's public key is authentic and matches the information in the registry (414). The IoT device 182/184/186 performs a DNSSEC enabled DNS query to ensure the public key registered for the IoT device UCCID match using a CERT DNS query as for example defined in rfc4398 [https://tools.ietf.org/html/rfc4398] (416) The registry 130 returns the registry CERT record for the identified registry (418). The device 182/184/186 can then verify the certificate to confirm the registry identity and also verify the signature of the received profile (420) based upon the registry 130 public key. If the certificate don't match then the device could be compromised. Confident with the identification of the registry 130, the device 182/184/186 reads the encrypted content of the IoT security applet which sends it to the eSIM to be decrypted with the corresponding unique private key to be installed (422). Once the profile is installed, the device 182/184/188 then performs a DNSSEC enabled DNS query for the associated device CERT record to ensure that the credential certificates are genuine and not tampered with (424). The registry 130 provides a response with the IoT device CERT record (426). The device 182/184/186 can then perform a hash of the credential certificate public keys for the IoT device to determine if the public keys match (428). If the key hashes do not match then the device could be compromised, otherwise a confirmation is returned from the registry 130. Now confident the credentials and connection information are authentic, the device then needs to establish a transport layer security or datagram transport layer security (TLS/DTLS) connection to ASP2 150 (430). ASP2 150 verifies the authenticity of the IoT device 182/184/186 keys by requesting IoT device CERT record from the registry 130 by a DNSSEC DNS query (432). The registry 130 provide the IoT device CERT record (434) which the ASP2 150 can then verify the public keys contained therein (436). If the keys don't match then the device could be compromised. The IoT device can then optionally perform a DNSSEC for the Transport Layer Security (TLSA) protocol record [http://tools.ietf.org/html/rfc6698] record for _443._TCP.ASP 1.XXX matches the key presented by ASP2's IoT service endpoint (438). The registry 130 provides the TLSA (440) which can then be confirmed by the device (442) The TLS/DTLS connection is then completed (444) and a confirmation can be provided to the owner 110 from ASP2 150 (446).

Figure 5:
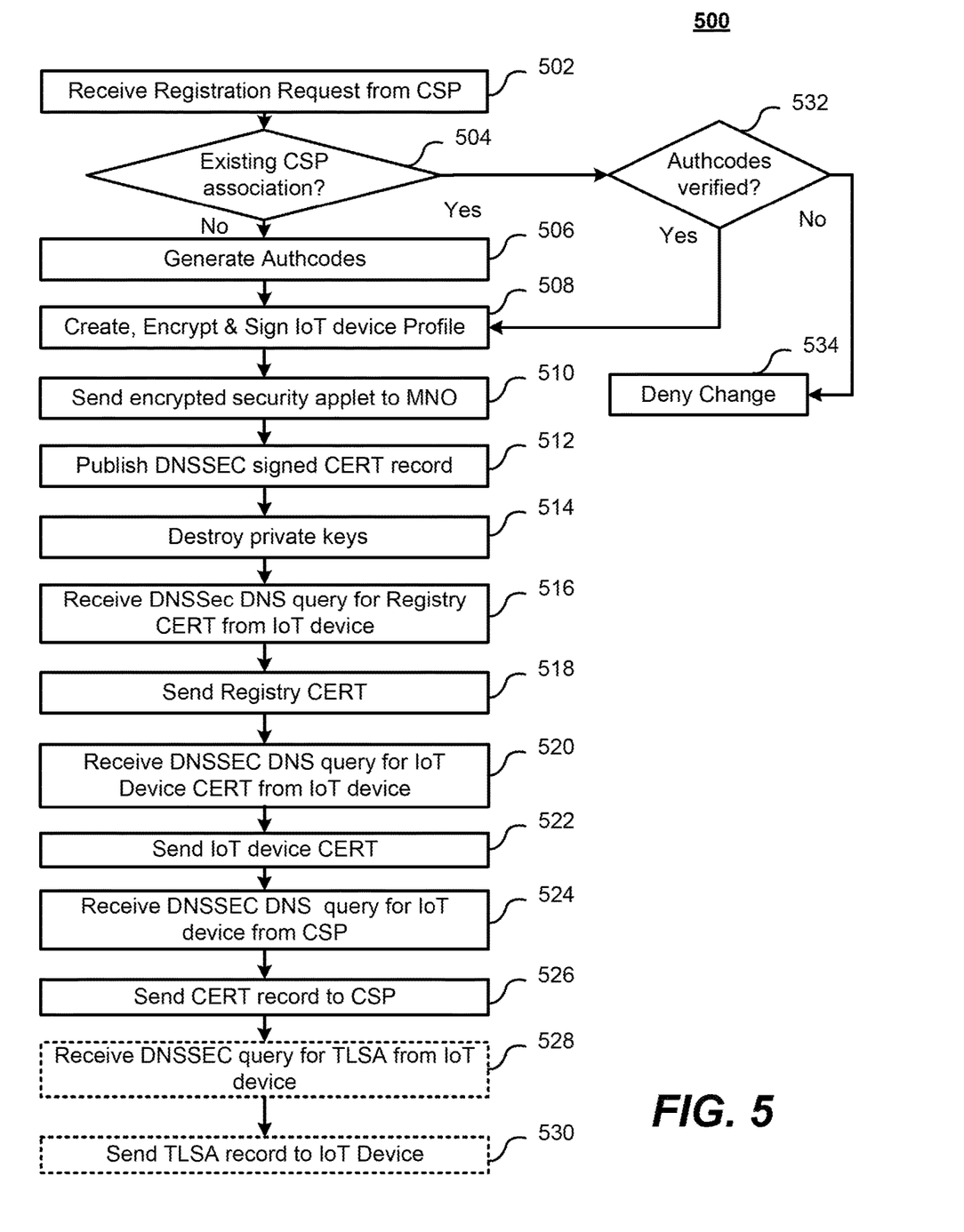
FIG. 5 shows a method for networked IoT device registration with a registry with a first cloud service provider.

FIG. 5 shows a method for networked IoT device registration with a secure registry with a first cloud service provider. The registry receives a registration request from a CSP (502) to associate device(s) for the owner. If the device is not currently associated with the CSP (No at 504) authcodes are generated (506) to associate with the devices and provided to the CSP and owner of the networked IoT devices. If the device is already associated with a CSP (Yes at 504) authcodes that were provided by the CSP are verified (532). If the authcodes are verified, i.e. match stored codes, (Yes at 532) an IoT device profile is generated with MNO information and is encrypted (508) into a security applet and sent to the MNO (510). The IoT Registry 130 publishes in its authoritative DNS a DNSSEC signed CERT record for that IoT device (512). If the authcodes are not verified (No at 532) the CSP change is denied (534). After the device(s) have been provided with the security applet (510) the private keys that were generated are destroyed (514). A DNSSEC DNS query is received from the devices at the registry to verify the CERT record of the registry (516). The registry sends the registry CERT record (518) to each of the requesting devices. The registry then receives a DNSSEC query the IoT device CERT record from the IoT device (520). The CERT record for the IoT device is provided (522). As the device and CSP initiate a TLS/DTLS connection the registry receives a DNSSEC query using CERT DNS from CSP for the IoT device CERT record (524). The IoT device CERT record is provided to the CSP (526). Optionally the registry may receive a DNSSEC query from the device(s) to verify TLSA record (528) which is provided to the IoT device (530) for verification. The device(s) are then successfully associated with the CSP when the TLS/DTLS connection is successful. As noted above, if TLSA is not utilized the CA certificate may be provided for the verification process.

Figure 6:
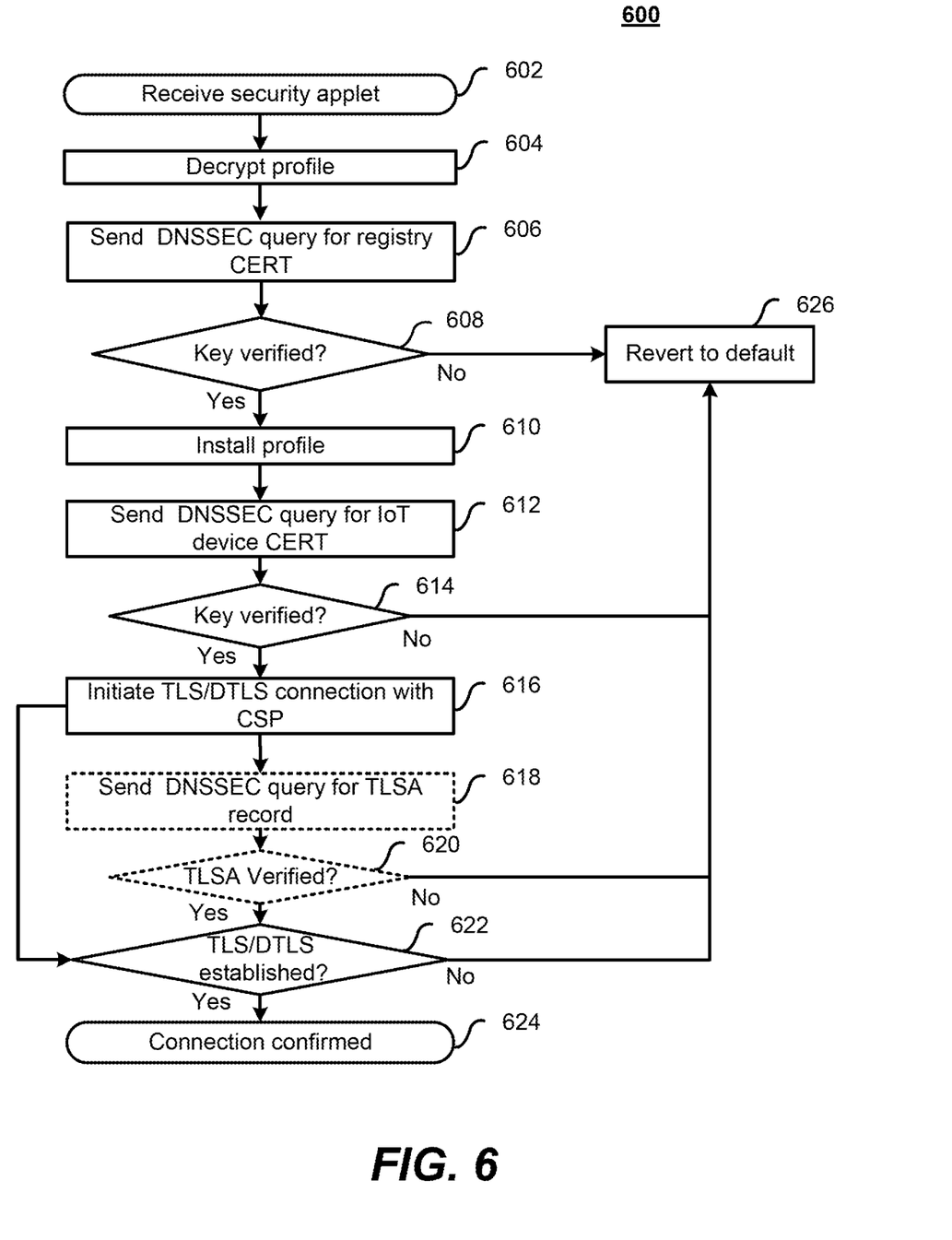
FIG. 6 shows a method of registering a networked IoT device.

FIG. 6 shows a method of registering a mobile IoT device. On initial power up the device will access the mobile network and send deviceID and associated public keys to the MNO which is forwarded to the registry and to the device owner. The public keys may have been provided by the manufacturer. Upon initial configuration, or when a CSP change is performed, a security applet is received from the registry 130 (602) to configure the device for communication with an CSP associated with the owner. The applet is decrypted (604) and a DNSSEC query for the registry CERT record is sent to the registry (606). A received CERT record can then be verified at the device. If the signature is verified (Yes at 608) the profile is installed (610). If the signature of a received device CERT record cannot be verified (No at 608) the device can revert to a default mode (626). Once the profile is installed the device (610), the device sends a DNSSEC query using for the device CERT (612). If a received device certificate is verified (Yes at 614) a TLS/DTLS connection can be initiated with the CSP (616). If the TLS/DTLS connection is successfully established (Yes at 622) the connection is confirmed (624). If the TLS/DTLS connection is not successfully establish (No at 622) the device can revert to a default state (626).

Optionally, as part of the TLS/DTLS connection, the device can send a request for confirmation for the TLSA record to the registry (618). If the registry verifies the TLSA record (Yes at 622) the connection is confirmed (624), otherwise (No at 622) the device can revert to a default state (626).

Each element in the embodiments of the present disclosure may be implemented as hardware, software/program, or any combination thereof. Software codes, either in its entirety or a part thereof, may be stored in a computer readable medium or memory (e.g., as a ROM, for example a non-volatile or non-transitory memory such as flash memory, CD ROM, DVD ROM, Blu-ray™, a semiconductor ROM, USB, or a magnetic recording medium, for example a hard disk). The program may be in the form of source code, object code, a code intermediate source and object code such as partially compiled form, or in any other form.

It would be appreciated by one of ordinary skill in the art that the system and components shown in FIGS. 1-6 may include components not shown in the drawings. For simplicity and clarity of the illustration, elements in the figures are non-limiting of the elements structures. It will be apparent to persons skilled in the art that a number of variations and modifications can be made without departing from the scope of the invention as defined in the claims.

The invention claimed is:

1. A method of a networked Internet-of-Things (IoT) device management at a registry server, the method comprising: receiving through a mobile network a device identifier (ID) and a public encryption certificate (CERT) associated for a networked IoT device from a cloud service provider (CSP); generating an encrypted applet using the public encryption CERT associated with the networked IoT device, the encrypted applet containing public and private encryption CERT for the networked IoT device, a registry public CERT and CSP network connection information for association with an eSIM of the networked IoT device; sending the encrypted applet to a mobile network operator (MNO) of the mobile network; receiving a request from the networked IoT device via the mobile network to provide a registry CERT; sending the registry CERT to the networked IoT device; receiving a request from the networked IoT device to provide an associated record for the networked IoT device; sending the networked IoT device CERT to the networked IoT device; receiving a request from the CSP to provide the associated record for the networked IoT device; and sending the IoT device CERT to the CSP; wherein requests from the networked IoT device and the request from the CSP are each received in a DNSSEC query at the registry server.

2. The method of claim 1 wherein if the device ID has been previously associated with another CSP, the method further comprising receiving and verifying an authorization code associated with the device ID from the requesting CSP wherein the transfer is denied if the authorization code does not correspond to a stored authorization code.

3. The method of claim 2 wherein if the networked IoT device has not been previously associated with the CSP, an authorization code for verifying ownership is generated and provided to the requesting CSP.

4. The method of claim 3 further comprising: receiving a DNSSEC request from the networked IoT device to provide a Transport Layer Security Authentication (TLSA) protocol record; and sending the TLSA record to the networked IoT device.

5. The method of claim 1 wherein the encrypted applet included a networked IoT device profile.

6. The method of claim 5 wherein the networked IoT profile is encrypted with a public encryption key associated with the networked IoT device.

7. The method of claim 6 wherein the networked IoT profile is encrypted with a private key for the CSP.

8. The method of claim 1 wherein the record for the networked IoT device comprises a public encryption key for the IoT device.

9. The method of claim 1 further comprising: generating an authorization code (authcode) for an owner of the networked IoT device; and sending the authorization code to the CSP.

10. The method of claim 1 further comprising destroying the private encryption key after creating the applet.

11. The method of claim 1 further comprising publishing to an authoritative DNS a DNSSEC signed CERT record for that IoT device.

12. The method of claim 1 further comprising: receiving a public CERT from the networked IoT device; signing a private CERT associated with the registry; and sending the signed public CERT to the networked IoT device.

13. A non-transitory computer readable memory containing instructions which when executed by a processor perform the method of: receiving through a mobile network a device identifier (ID) and a public encryption certificate (CERT) associated for a networked IoT device from a cloud service provider (CSP); generating an encrypted applet using the public encryption CERT associated with the networked IoT device, the encrypted applet containing public and private encryption CERT for the networked IoT device, a registry public CERT the CSP network connection information; sending the encrypted applet to a mobile network operator (MNO) of the mobile network; receiving a request from the networked IoT device via the mobile network to provide a registry certificate; sending the associated registry CERT to the networked IoT device; receiving a request from the networked IoT device to provide an associated record for the networked IoT device; sending the networked IoT device CERT to the networked IoT device; receiving a request from the CSP to provide the associated record for the networked IoT device; and sending the networked IoT CERT to the CSP; wherein requests from the networked IoT device and the request from the CSP are each received in a DNSSEC query at the registry server.

14. A method of managing a networked IoT device, the method comprising: receiving a security applet from a registry system coupled to a computer network for associating the networked IoT device with an application service provide (CSP) associated with an owner of the networked IoT device; decrypting security applet containing public and private encryption keys associated with the networked IoT device, and CSP connection information for association with an eSIM of the networked IoT device; sending a first query for a first certificate associated with the registry; verifying the first certificate received from the registry; installing cloud service provider profile on an eSIM of IoT device when the first certificate is verified; sending a second query for a second certificate associated with the networked IoT device; and verifying the second certificate received from the registry; wherein first query and second query are DNSSEC queries and the first certificate and second certificates are CERT records.

15. The method of claim 14 wherein verifying the first certificate or the second CERT records comprises comparing a corresponding record received in the security applet.

16. The method of claim 14 wherein the security applet is encrypted with a public key associated with the networked IoT device.

17. The method of claim 14 further comprising initiating a transport layer security/Datagram Transport Layer Security (TLS/DTLS) connection by: sending a third DNSEC request for a TLS Authentication (TLSA) record from the registry; and verifying the TLSA record received from the registry prior to completing the TLS/DTLS connection.

18. The method of claim 14 further comprising initializing the networked IoT device by: receiving an initial configuration from a manufacturer server; install the initial configuration in an eSIM of the networked IoT device; and sending a device identifier and associated public encryption keys to the registry.

* * * * *